J. B. HERR.
Cultivator.
No. 59,013. Patented Oct. 23. 1866.
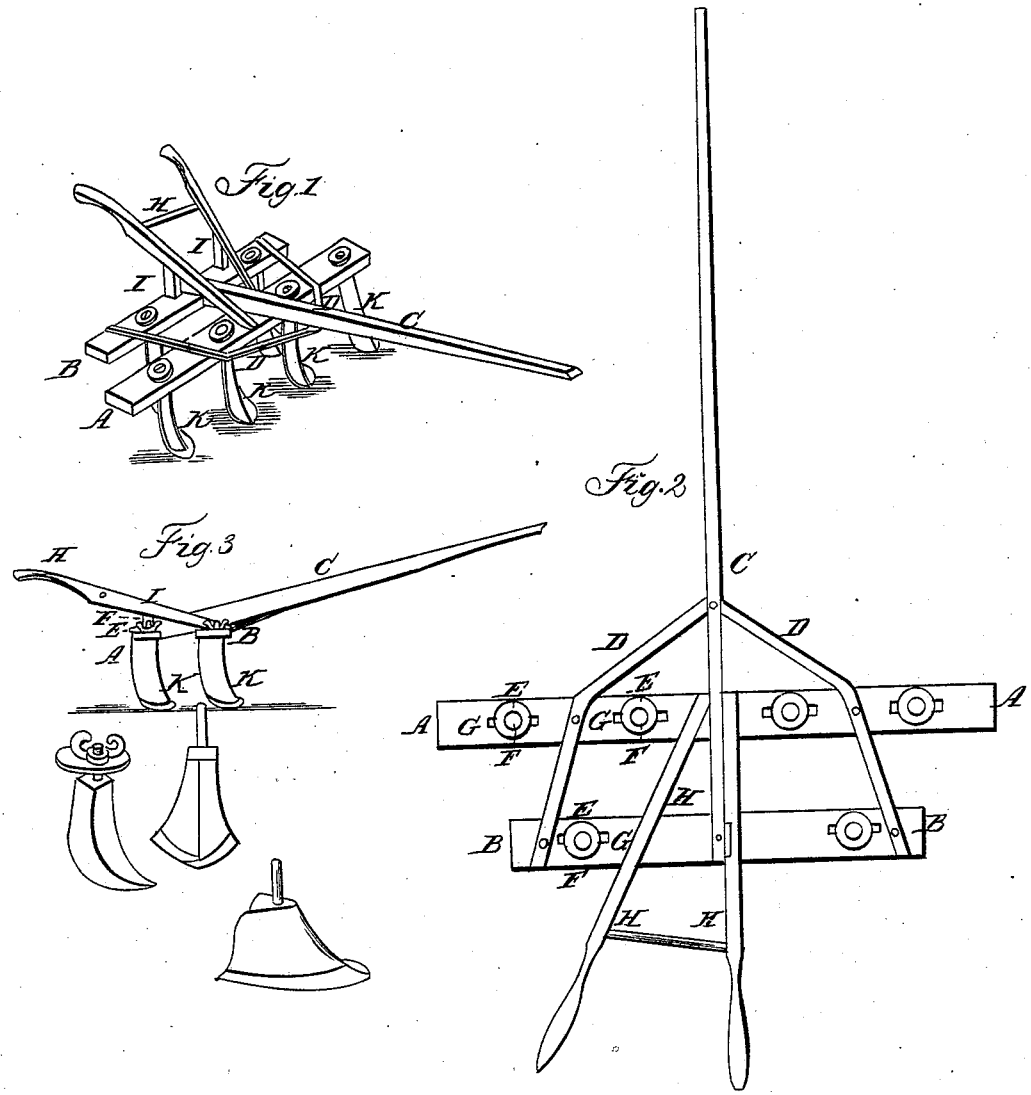

UNITED STATES PATENT OFFICE.

JOHN B. HERR, OF WEST LAMPETER TOWNSHIP, LANCASTER COUNTY, PA.

IMPROVEMENT IN CULTIVATORS.

Specification forming part of Letters Patent No. 59,013, dated October 23, 1866.

*To all whom it may concern:*

Be it known that I, JOHN B. HERR, of West Lampeter township, in the county of Lancaster and State of Pennsylvania, have invented a new and useful Improvement in the Construction of Cultivators for Dressing Indian Corn and Preparing the Soil; and I do hereby declare that the following is a full, clear, and exact description of the construction and operation of the same, reference being had to the accompanying drawings, and letters of reference marked thereon, making a part of this specification, in which—

Figure 1 is a perspective view of the combined parts and their arrangement. Fig. 2 is an enlarged plan view, seen directly from above. Fig. 3 is a side or profile view of the same.

The nature of my invention consists in the use of two shovel-beams, parallel to each other, with a central tongue bracing the two beams, and again braced by the handles and band, having four shovels in the front beam and two in the rear beam, all made adjustable within oblong slots and firmly held by binding-screws.

The object attained is compactness and greater facility in managing the machine, so simplified in its construction as to be cheaper, more durable, and it will perform the work as well, if no better, than any other cultivator in use.

The construction is so simple that a glance at the drawings will enable any one skilled in the art to make and use my invention.

The front beam, A, has four shovels, K, two passing on each side of the row of corn, and can be adjusted by setting the two central shovels closer or more remote from the plants, according to their size and amount of soil to be worked up to them. The machine thus straddles the rows, and the path of the horses is between the rows, for which purpose the handles H are turned upon one side, so that he who guides the machine has the row of corn he is cultivating on his right-hand side.

The rear beam, B, is parallel to the front beam, having but two shovels, K, also made adjustable in the slots G. These follow to more fully stir the soil and pulverize it.

The handles H are affixed on both sides of the tongue C, raised and carried obliquely to the left from their connection with the tongue or pole c and front beam, A, supported by the uprights I, framed into the rear beam, B. The parts are in addition braced by an iron band, D, bolted to the tongue and the beams A and B, as shown.

The shovels may be of the ordinary kind mostly preferred.

I also claim the privilege to use scrapers in place of the shovels, or shovels for finishing, provided with flanges specially adapted for that object. These changes are easily made.

I am fully aware of the multiplicity of cultivators of varied forms and complications, with and without wheels or pulleys and sundry contrivances for specified objects; but my experience is that the more practical and simple an implement is the more desirable it is on the farm.

No form or combination in the arrangement of the shovels in the beams can be better adapted than when placed parallel and at right angles with the force applied or draft of the horses, as I have them.

Simple as my construction and arrangement is, I believe it to be novel, having tested the utility, upon which I have no question, being fully satisfied that no better can be desired.

I am also aware, owing to the multiplicity of existing patents, that I can only claim the specific form and construction of my machine, which, indeed, is the case with most of the inventions in use. It is only adding a more simple and desirable machine to the number to select from.

What I claim as my invention, and desire to secure by Letters Patent, is—

The combination and arrangement of the parallel shovel-beams A B, united by the tongue C, handles H, and braces D, when constructed and operating in the manner and for the purpose specified.

JOHN B. HERR.

Witnesses:
WM. B. RILEY,
EMLEN FRANKLIN.